(12) United States Patent
Girolami et al.

(10) Patent No.: US 11,835,177 B2
(45) Date of Patent: Dec. 5, 2023

(54) CONTROL SYSTEM FOR CONTROLLING THE ACCESS TO TISSUE PAPER CONVERTING LINES AND THE LIKE, AND RELATED METHOD

(71) Applicant: FABIO PERINI S.P.A., Lucca (IT)

(72) Inventors: Ivano James Girolami, Lucca (IT); Matteo Favilla, Lucca (IT); Michele Puccini, Lucca (IT)

(73) Assignee: Fabio Perini S.p.A., Lucca (IT)

( * ) Notice: Subject to any disclaimer, the term of this patent is extended or adjusted under 35 U.S.C. 154(b) by 480 days.

(21) Appl. No.: 17/284,039

(22) PCT Filed: Oct. 9, 2019

(86) PCT No.: PCT/EP2019/077315
§ 371 (c)(1),
(2) Date: Apr. 9, 2021

(87) PCT Pub. No.: WO2020/074564
PCT Pub. Date: Apr. 16, 2020

(65) Prior Publication Data
US 2021/0381643 A1    Dec. 9, 2021

(30) Foreign Application Priority Data
Oct. 10, 2018   (IT) .................. 102018000009307

(51) Int. Cl.
*F16P 3/00*     (2006.01)
*F16P 3/08*     (2006.01)
*F16P 3/14*     (2006.01)

(52) U.S. Cl.
CPC ................ *F16P 3/00* (2013.01); *F16P 3/08* (2013.01); *F16P 3/14* (2013.01); *F16P 3/147* (2013.01); *B65H 2407/10* (2013.01)

(58) Field of Classification Search
CPC ........ F16P 3/00; F16P 3/08; F16P 3/12; F16P 3/14; B65H 26/00; B23B 3/28;
(Continued)

(56) References Cited

U.S. PATENT DOCUMENTS

| 2002/0106209 A1* | 8/2002 | Niimura ................ B41J 11/009 399/45 |
| 2003/0016259 A1* | 1/2003 | Otokita ................. B41J 11/009 347/14 |

(Continued)

FOREIGN PATENT DOCUMENTS

| GB | 2072786 A | 10/1981 |
| WO | 2017064077 A1 | 4/2017 |

OTHER PUBLICATIONS

NPL Search (Sep. 22, 2023).*

*Primary Examiner* — Van T Trieu
(74) *Attorney, Agent, or Firm* — Breiner & Breiner, L.L.C.

(57) ABSTRACT

A web material converting line is disclosed, in particular for converting tissue paper, including a plurality of converting sections arranged in sequence along a feeding direction of a web material to be converted, each section including a converting machine; at least one converting section of the converting line includes a detection system for detecting the presence of people near the converting section. The detection system includes at least a first presence sensor and is adapted to detect the presence of people in at least a controlled area. The controlled area is subdivided into an accessible area that can be accessed when the line is working, and an alarm area. The detection system is adapted to distinguish between the presence of an individual in the accessible area and the presence of an individual in the alarm area. The detection system is connected to a control unit
(Continued)

adapted to intervene on the operation of the converting section based on information provided by the detection system.

22 Claims, 8 Drawing Sheets

(58) Field of Classification Search
CPC .......... B22B 37/00; B22B 37/12; B07C 3/14; B07C 3/18; G06F 17/30
See application file for complete search history.

(56) References Cited

U.S. PATENT DOCUMENTS

2009/0139912 A1* 6/2009 Yui ........................... B07C 3/14
707/999.107
2014/0102249 A1 4/2014 Foerch et al.

* cited by examiner

CONTROL SYSTEM FOR CONTROLLING THE ACCESS TO TISSUE PAPER CONVERTING LINES AND THE LIKE, AND RELATED METHOD

TECHNICAL FIELD

The present invention relates to web material converting lines. In particular, the present invention relates to tissue paper converting lines.

BACKGROUND ART

The converting lines for converting web material wound into rolls, for example and in particular the tissue paper converting lines, comprise a plurality of stations arranged in sequence and comprising large machines with moving members that can be dangerous for the operators. For this reason, in addition to the usual passive safety systems, comprising fences with access doors locked when the machines are working, active systems have been also developed, performing highly complex checks for avoiding hazardous situations. A system of this kind is disclosed for instance in WO2017064077A1.

However, the state-of-the-art systems have some limits or aspects that can be further improved, for example for increasing the operator's safety, increasing the visibility and ergonomics of the working machinery, reducing the fence dimensions while keeping the safety measures.

SUMMARY OF THE INVENTION

A web material converting line is substantially provided, in particular a tissue paper converting line, comprising a plurality of converting sections arranged in sequence along the feeding path of the web material to be converted. Each section or portion of the converting line comprises a converting machinery with moving parts. According to the invention, at least one section or portion of the line comprises a detection system for detecting the presence of people near the converting section. The detection system comprises at least a first presence sensor adapted to detect the presence of people in at least a controlled area. The controlled area comprises an accessible area that can be accessed when the line is working, i.e. an area that can be freely accessed without the need for stopping the machinery of the section to which the detection system is associated. In addition to the area accessible when the line is working, called "collaboration area", the controlled area comprises also an alarm area. The alarm area is closer to the machinery than the collaboration area; when an individual accesses the alarm area, the machinery in the converting section is stopped.

Advantageously, the converting section, to which the detection system is associated, comprises machines that can be stopped quickly, i.e. machines with low inertia, or machines moving slowly. In this way, the alarm area can be pretty small. When the detection system detects an individual (or a vehicle) entering the alarm area, the time necessary to the individual to go very close to the moving parts of the machinery is sufficient to stop these moving parts, which could be dangerous for the user.

The detection system is adapted to distinguish between the presence of an individual in the accessible area when the line is working (collaboration area), and the presence of an individual in the alarm area. In this way, it is possible to act differently on the machinery in the converting section, based on whether the individual has been detected in the accessible area or in the alarm area. To this end, the detection system can be advantageously connected to a control unit adapted to intervene on the operation of the converting section based on information provided by the detection system.

Practically, with such a system an operator can approach the machinery of the converting section up to be at a distance therefrom (in the collaboration area) where he/she can, for example, visually check the operation of the machinery while it is still working, if necessary at reduced speed.

Alternatively, the operator can move closer to the machinery of the converting section, for example for accessing the inside thereof. The presence of the operator in the alarm area entails the stop of the machine; in this way, the operator can access the converting section safely.

Going close to, and accessing, the line do not require particular interventions by the operator. In fact, the sensors of the detection system distinguish the action performed by the operator (movement towards or closer to the alarm area) and, through the control unit, make the machinery act based on whether there is an immediate risk for the operator or he/she is at safety distance.

The controlled area can be provided at a side of the converting section with respect to the longitudinal extension thereof. In this case, the controlled area can extend, for example, at the side of the converting section and can be provided with an alarm area between the machinery and a collaboration area, this latter being at a greater distance from the machinery than the alarm area.

In advantageous embodiments, the control unit intervenes on the converting section when the detection system detects the presence of an individual in the area accessible when the line is working (collaboration area) but does not detect the presence of an individual in the alarm area. The intervention on the converting section is not compulsory a stop thereof; in fact, the intervention can keep the section working. For example, and in particular, the intervention can be constituted by a slowdown of the converting section, i.e. a reduction in the operating speed. In case of an unwinder, the intervention can entail a reduction in the speed of rotation of the roll of web material. This slowdown has a double function. On the one hand, it gives the operator a stronger sense of safety while he/she is near the converting line. On the other hand, the slowdown can precede a subsequent sudden stop, which can be controlled by the control unit when the operator, who entered the collaboration area, moves closer to the converting section and reaches the alarm area.

In this way, the whole controlled area can be "open", i.e. not fenced and accessible by the operators safely. The operators can also arrive close to the machines without the need for preventive stopping the machine; the stop of the machinery is directly controlled by the control unit based on the data provided by the detection system and the sensors thereof.

The detection system may comprise one or more sensors associated with the controlled area. The number and arrangement of the sensors depends on the physical features thereof, in particular on the range of the sensors and the dimensions and shape of the controlled area. In advantageous embodiments, a single sensor is provided, with a range suitable to cover the whole controlled area at a side of the converting section.

The sensors may be laser scanners of suitable range and definition, as detailed below.

In some embodiments, the detection system may comprise at least a second presence sensor adapted to detect the presence of people in an auxiliary controlled area. The auxiliary controlled area may be arranged at a greater height than the controlled area. For example, the controlled area may be at the same height as the floor of the plant where the converting line is installed, whilst the auxiliary controlled area may be arranged at the height of a platform, catwalk, bridge or other structure that can be accessed through one or more steps.

In some embodiments, the controlled area is arranged at a side of the converting section and the auxiliary controlled area(s) are arranged transversally with respect to the line and are contained within the line limits; in other words, the auxiliary controlled areas extend between two opposite flanks or sides of the converting line. To this end, an auxiliary controlled area can be associated with, or correspond to, a catwalk or bridge extending from one flank of the converting line to the other flank. The access to the auxiliary controlled area can be arranged in, or close to, the collaboration area. The auxiliary controlled area may comprise, in turn, a collaboration area where an operator can enter without intervening onto fences, doors or other closing elements, and without stopping the machinery of the converting section. It is also possible that, in case of access to the collaboration area of the auxiliary controlled area, detected by the detection system, the control unit causes a temporary slowdown of the converting section.

The control unit may be programmed so as to increase again, after slowdown caused by an operator entering the collaboration area, the speed of the processing section until reaching the working speed again when the operator exits the collaboration area (of the controlled area and/or of the auxiliary controlled area) and if no people are detected in the alarm area.

A fenced area may be provided around or inside the converting section, which can be accessed after having opened safety doors. The fenced area may be arranged, for instance, inside the converting section (rather than at a side thereof). The auxiliary controlled area, if provided, may comprise a fenced area. As will be better explained with reference to embodiments of the invention, the auxiliary controlled area may comprise: an auxiliary collaboration area, which can be accessed without stopping the machinery, but if necessary slowing it down; and an alarm area in a fenced area, that can be accessed after having stopped the machinery of the converting section and after the door has been opened.

In the fenced area or in each fenced area a presence sensor may be provided. The presence sensor in the fenced area(s) may provide information on the presence of an individual, for instance an operator, in the fenced area, and may prevent the restart of the machinery of the converting section until the operator has exited the fenced area.

For instance, in case of a catwalk allowing accessing the converting line, a door may prevent access to a fenced part of the catwalk. In some embodiments, the catwalk may extend outside the converting line, at a side thereof, and may form a raised collaboration area, that can be accessed for instance through a series of steps. In this way, the operator may achieve the height of the catwalk, or an intermediate height, where he/she can observe the working machinery from a short distance, but always under safe conditions. The access to the fenced area may be subject to the stop of the machinery of the converting section, controlled for example through a panel or a pushbutton station, or through the detection of the operator entering the alarm area.

Accessing a fenced area can be necessary, for example, for cleaning purposes, for performing maintenance operations, removing material jammed in the line, inserting web material along the feeding path in case of accidental breakage of the web material and/or of exhaustion of the roll (so-called jog, described in greater detail below), and in general in all cases where the operator shall enter inside the area where the machinery is arranged, not only stay at the side thereof.

The presence sensors can be electromagnetic wave sensors, for example laser scanners, with range up to 8.4 m and resolution adapted to detect object of minimal dimensions up to 20 mm.

Further features and embodiments of the converting section are described below and defined in the attached claims.

A method is also disclosed for controlling a section of a converting line, the method comprising the following steps:
controlling, by means of at least one presence sensor, an accessible area that
can be accessed when the line is working, and an alarm area;
if an individual enters the accessible area without entering the alarm area, intervening on the operation of the converting section without stopping it;
if an individual enters the alarm area, stopping the converting section.

Further features and embodiments of the method are described below and defined in the attached claims.

BRIEF DESCRIPTION OF THE DRAWING

The invention will be better understood by following the description below and the attached drawing, showing a non-limiting embodiment of the invention. More specifically, in the drawing.

DETAILED DESCRIPTION OF AN EMBODIMENT

The converting line may comprise a plurality of working stations or sections, each comprising one or more machines with moving parts. In particular, a tissue paper converting line may comprise one or more unwinders, a printing machine, an embossing machine, a rewinder, a tail sealer, an accumulator, a log saw for cutting the logs into small rolls, a series of conveyors and members for grouping the small rolls, a packing machine wrapping packs of more rolls, a bagging machine bagging groups of packs, a palletizing machine for piling on pallets the bags of packs. The system described below can be applied to one or more sections or stations mentioned above. Particular advantages can be obtained by applying the safety system to the unwinder(s) of the converting line. Below, particular reference will be therefore made to the unwinding section of the converting line.

Essentially, a controlled area is created at a side of the section for which the access control is necessary, for example the unwinding section. The controlled area comprises an area of free access, also referred to as an area that can be accessed when the line is working or "collaboration area", near the section to which the safety system is associated. The area accessible when the line is working, i.e. the collaboration area, is so far from the machines to avoid risks to the operator's safety; however, if an operator is in this area, it is advisable to reduce the operating speed. An alarm area is provided between the cooperation area, which the operator can access without disabling the passive safety systems, and the moving parts of the machines. When an operator accesses the alarm area, a process is automatically started for stopping the converting section to which the safety system described herein is associated.

The collaboration area and the alarm area can be controlled through suitable sensors. For example, devices with 3D laser scanners can be used, or other sensors adapted for what described below.

Figure 1:
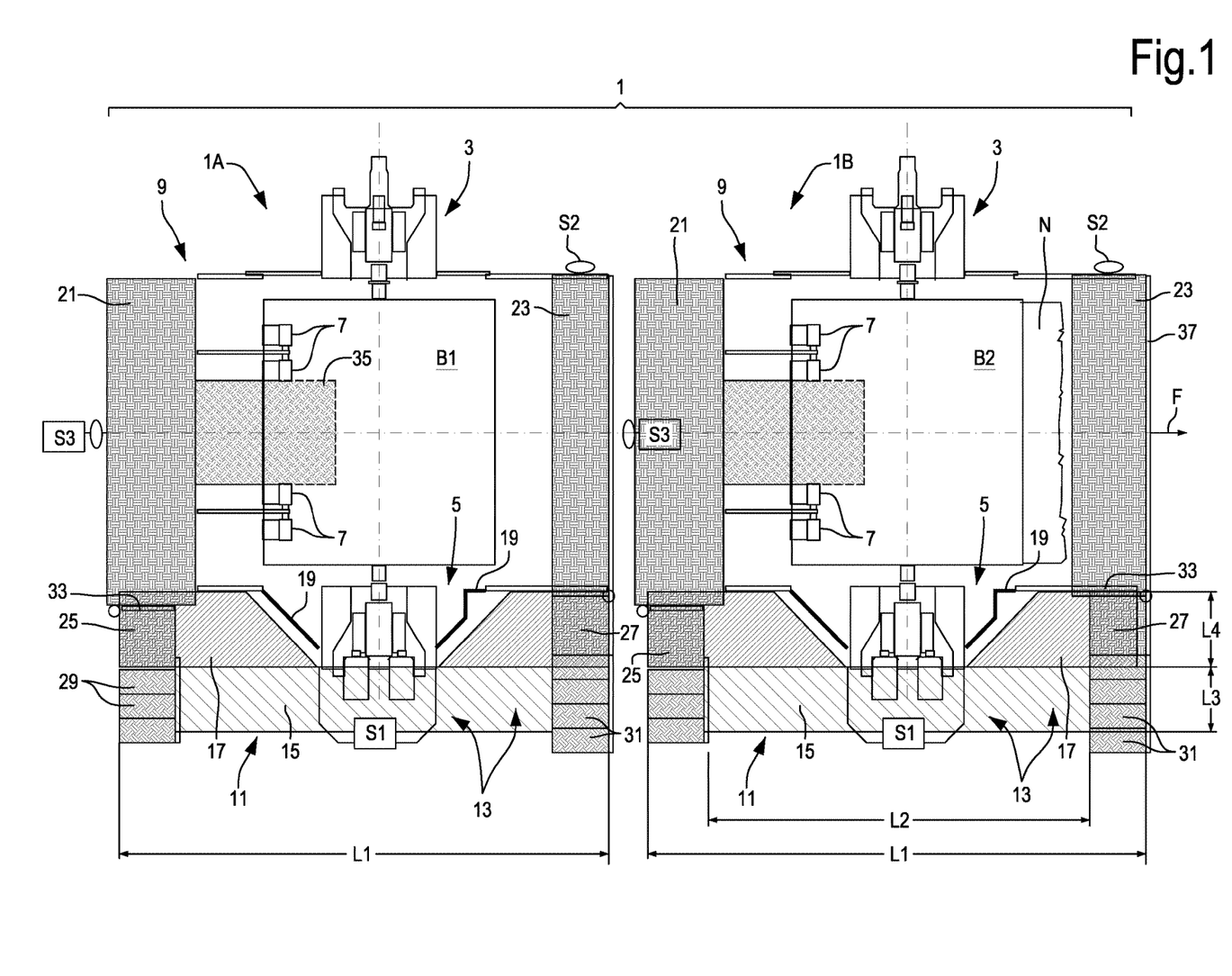
FIG. 1 is a plan view of an unwinding section of a web material converting line, in particular a tissue paper converting line.

With reference to the illustrated embodiment, FIG. 1 is a plan view of an unwinding section 1 that is part of a more complex tissue paper converting line. The unwinding section 1 may comprise one or more unwinders 1A, 1B. Each unwinder 1A, 1B may receive a roll B1, B2 of web material N to be unwound and supplied to the downstream sections. FIG. 1 schematically shows a portion of web material N being unwound from the roll B2.

Each unwinder comprises roll support systems, schematically indicated with 3, 5, and unwinding members, schematically indicated with 7. The unwinding members may comprise unwinding belts, schematically shown in FIG. 2A, 2B.

The line of which the unwinders 1A, 1B are part extends according to a feeding direction of the web material to be converted, that, in this area of the line, is in the form of one or more plies of web material. Reference numbers 9 and 11 indicate two sides of the line and thus two sides of the unwinding section 1. In the illustrated embodiment, the operators can access the machinery contained in section 1 from the side 11, i.e. from the right side with respect to the feeding direction F of the web material being unwound from the rolls B1, B2. Usually, but not necessarily, the side 11 is devoid of mechanical transmissions or has a lower number of mechanical moving parts than the side 9, where there are in fact the mechanical transmissions and that usually has a greater number of moving parts.

As will be better explained below, on the side 11 of the unwinding section 1, and more exactly on the side 11 of each unwinder 1A, 1B, a controlled area is provided, indicated as a whole with number 13 for each unwinder 1A, 1B. Below, the controlled area 13 is referred to as "side controlled area", as in the specific example it is arranged at a side of the converting line including the section 1 comprising the unwinders 1A, 1B.

The side controlled area 13 allows the operator to move towards, and to safely access the machinery of the unwinding section, controlled by the detection system for detecting the presence of people, which will be described in greater detail below.

The machinery of the unwinders 1A, 1B is known and is not therefore described in detail. It should be understood that what described below with reference to access control for the unwinding section 1 also applies to unwinders having different configurations. In some cases, the detection systems can be also applied to other converting sections, for example the accumulating and/or packing sections, where the web material is in the form of logs or groups of logs.

Also the side controlled area 13 can be subdivided into two areas or sub-areas, indicated with numbers 15 and 17. The area 15 is called collaboration area or area accessible when the line is working; in the illustrated embodiment, it is rectangular in shape, with plan dimensions L1×L3. The area 17 is the alarm area, whose plan dimensions are L2×L4. The alarm area 17 is provided between a casing 19 of the unwinder and the collaboration area 15. In this case, the casing 19 is mounted in reduced format not at safety distance from the machinery, i.e. far from the unwinders 1A, 1B, but directly on the flanks supporting the unwinders.

The alarm area 17 and the collaboration area 15 are controlled by means of one or more presence sensors. In the illustrated embodiment, only one presence sensor S1 is provided, that can be arranged in approximately central position. The sensor S1 may be a 3D laser scanner. The sensor can detect fixed or movable obstacles within the sensor range, and can detect the spatial coordinates thereof within a volume or space controlled by the same sensor.

In some embodiments, a raised platform can be associated with each unwinder 1A, 1B. In the illustrated embodiment, two raised platforms 21, 23 are associated with each unwinder 1A, 1B. The raised platforms 21, 23 can be accessed through a landing 25, 27 and a set of steps 29, 31. A door 33 is provided between the landing 25, 27 and the respective raised platform 21, 23. The raised platform 21, 23 represents a fenced area, accessible by opening the door 33. The door 33 can be controlled according to the operational conditions of the unwinding section, and in particular of the unwinder 1A, 1B, so that the access is allowed only when the machinery is stopped.

A second presence sensor S2 may be associated with the raised platform 23, and a third presence sensor S3 may be associated with the raised platform 21. The presence sensors S2, S3 may be of the same type as the sensor S1. The three sensors S1, S2, S3 are part of a detection system, which detects the presence of people in the various areas at the side of the unwinding section 1, and performs a series of functions and checks described below.

Each sensor S1 may be arranged so as to scan a volume flush with the floor, i.e. flush with the walking surface where the machinery of the converting line is fixed, for example at a height of 0-30 cm, preferably of 1-15 cm. Vice versa, in embodiments described herein, the sensors S2 and S3 are arranged so that the volume that they scan is at a greater height with respect to the floor where the machinery of the converting line is fixed. Typically and advantageously, the volume scanned by the sensors S1 and S2 can be flush with the walking surface defined by the platforms 21, 23 or slightly above said walking surface, for example at a height of 0-30 cm, preferably 1-15 cm from the walking surface of the platforms 21, 23.

With this arrangement, the sensor S1 of each unwinder 1A, 1B is adapted to detect the presence of an individual or of an obstacle in area 15 (collaboration area) and area 17 (alarm area). The features of the sensors S1 allow distinguishing in which area there is the obstacle or the individual. The sensors S2 and S3 are adapted to detect the presence of an individual or an obstacle on the respective platform 21, 23, on the corresponding landing 25, 27 and on the steps 29, 31.

The sensors S2, S3 may be adapted to distinguish whether the individual/the obstacle is on the landing 25, 27 or on the steps 29, 31 of the respective platform 21, 23, or on the part of platform inside the fencing or casing 19 of the unwinder, inside the respective door 33.

In the illustrated embodiment, each sensor S2, S3 controls an auxiliary controlled area 35, 37 respectively, extending transversally to the longitudinal extension of the converting line (arrow F). The auxiliary areas controlled by the two sensors S2, S3 may have the same shape. In the embodiments illustrated in the attached figures, the two sensors S2, S3 control areas of different shape, as the area of the sensor S3 has a part projecting towards the central area of the unwinder 1A. The auxiliary controlled areas also comprise the areas of the landings 25, 27. The auxiliary controlled areas are at a greater height than the collaboration area 15 and the alarm area 17.

Figure 2A:
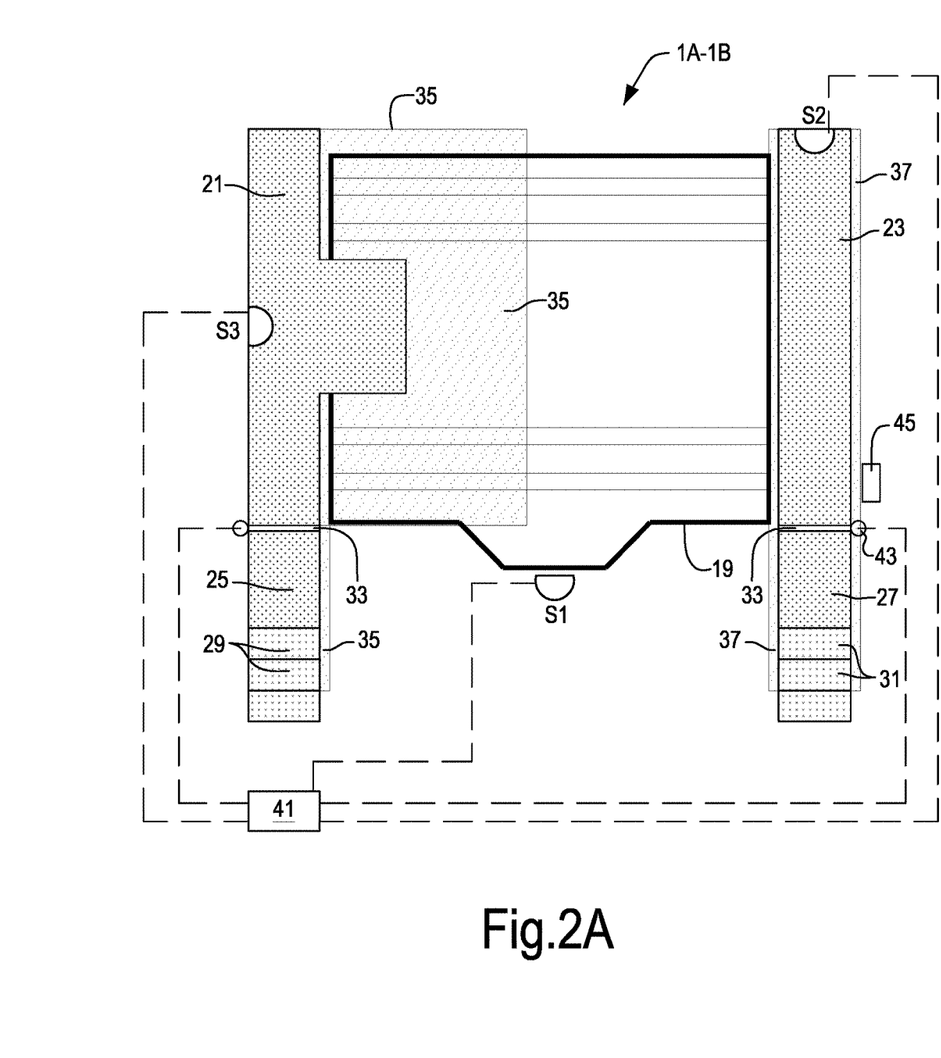
FIGS. 2A and 2B are schematic plan views of one of the two unwinders of the unwinding section of FIG. 1.
Figure 2B:
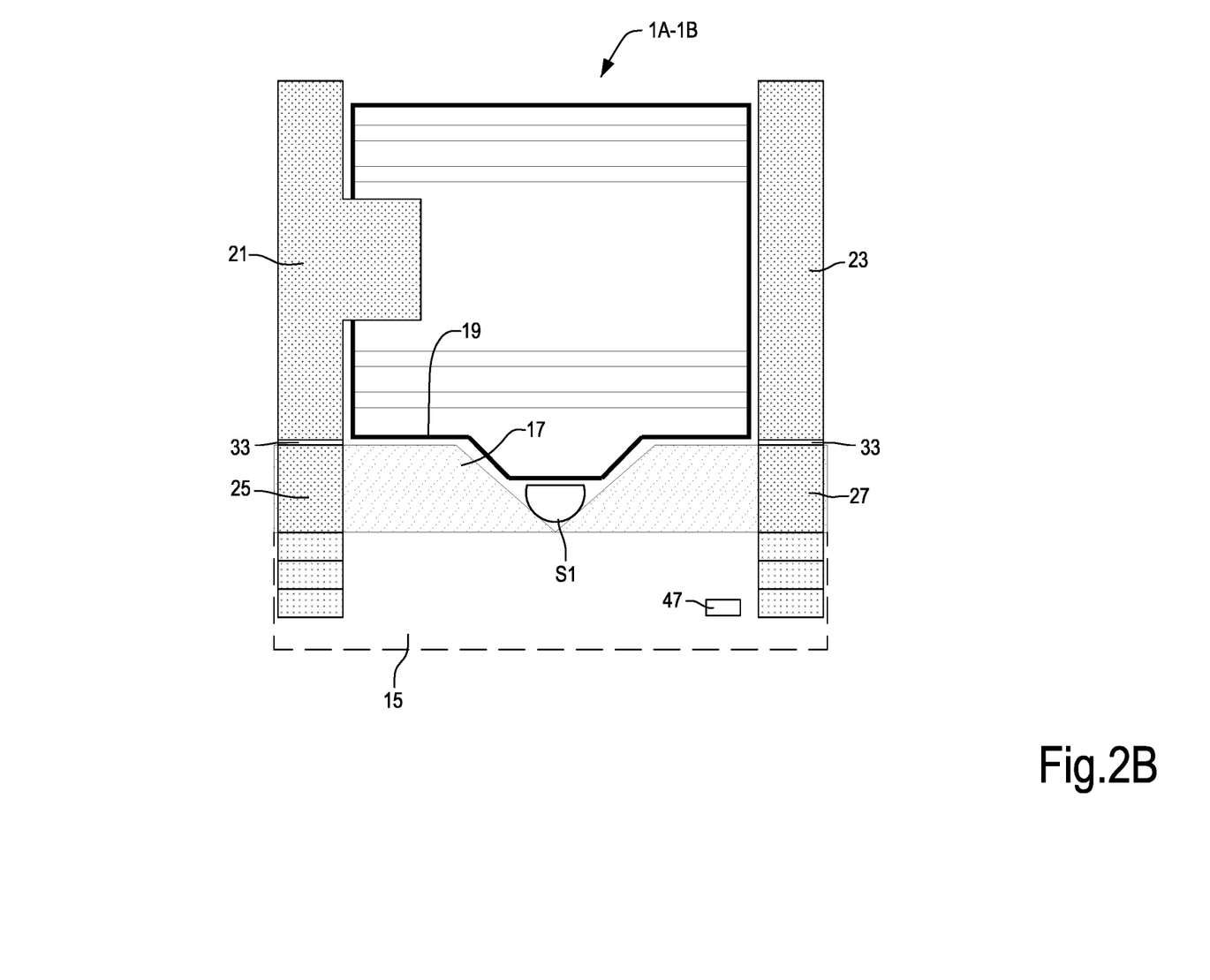

FIGS. 2A, 2B show, in a more schematically and simplified manner, for a single unwinder 1A, 1B, the space comprised within the casing 19, the plan position of the sensors S1, S2, S3, the position of the steps 29, 31, of the landings 25, 27 and of the platforms 21, 23, as well as the collaboration area 15, the alarm area 17 and the auxiliary controlled areas 35, 37.

Figure 3:
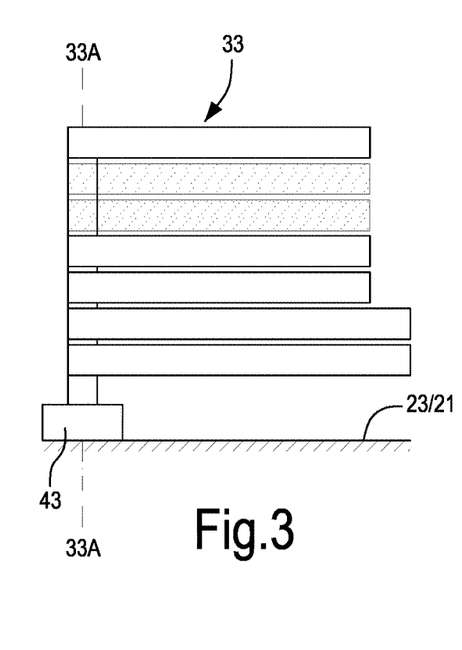
FIG. 3 is a schematic view of a door closing a fenced area of the unwinder.

FIG. 2A schematically shows also a control unit 41 interfacing the sensors S1, S2, S3 and the doors 33. In particular, the doors may be provided with opening-closing sensors, communicating to the control unit 41 whether the door is open or closed. Reference number 43 indicates a generic sensor for the door 33. FIG. 3 shows a front view of the door 33 that can be constituted by a plurality of horizontal panels hinged around a rotation axis 33A.

In the description below, the operation of the unwinder 1A, 1B will be described, with the detection system described above, comprising the sensors S1, S2, S3, and the control unit 41 in different operating conditions, in order to better understand the advantages of the invention.

Figure 4:
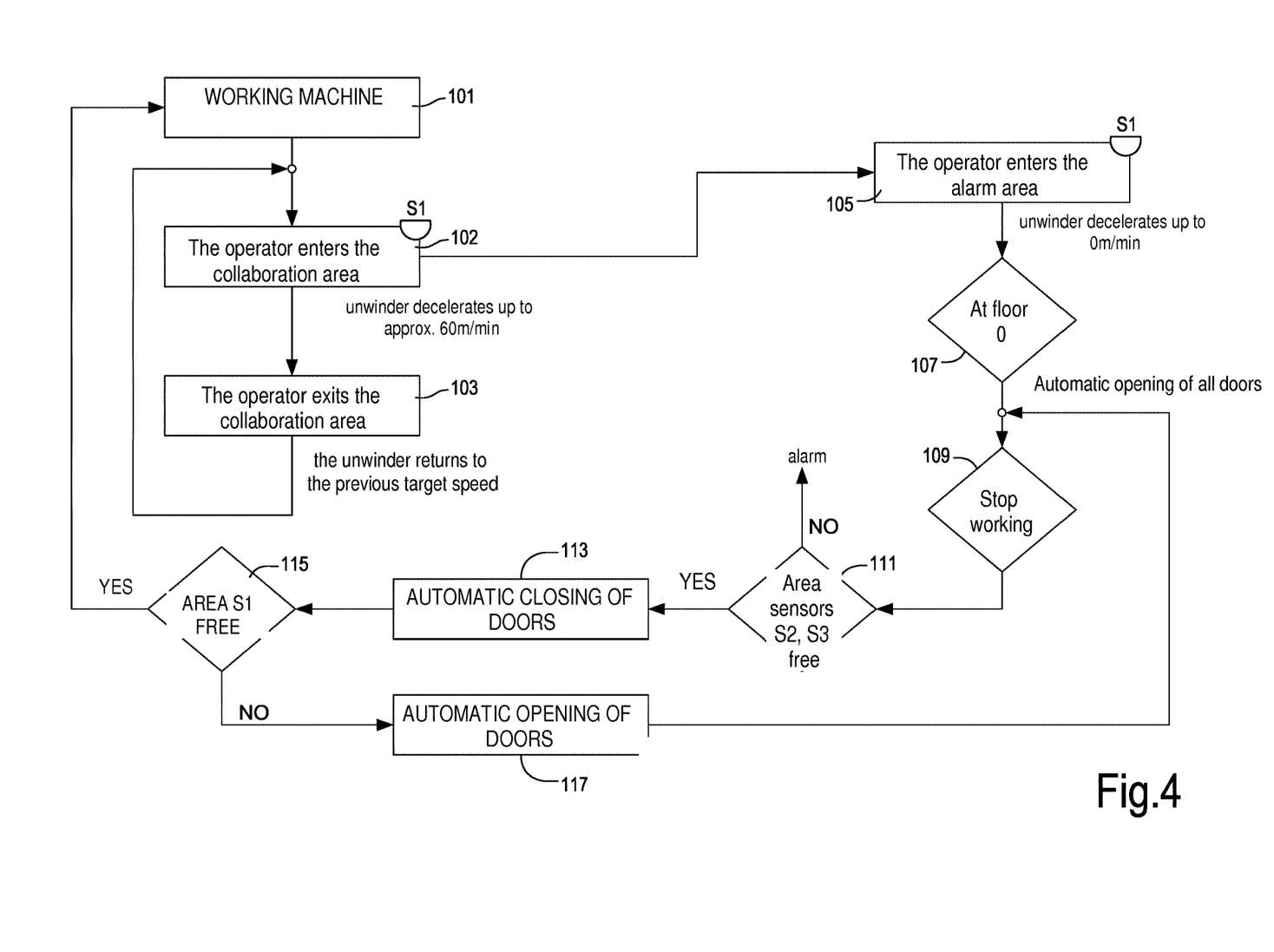
FIGS. 4 to 8 show flow diagrams of operations performed by the detection system and the control unit under different operating conditions.

FIG. 4 shows a block diagram of the operation of the system when the unwinder 1A, 1B is in normal operating condition. Let's assume that the machine (unwinder 1A, 1B) is in a condition of normal operation, for example unwinding a roll B1 or B2 at a working speed of 600 m/min. This condition is schematized in block 101. In block 102, an operator enters the side controlled area and, more specifically, the area accessible when the line is working, i.e. the collaboration area 15. The sensor S1 detects the presence of the operator in the collaboration area 15 and sends a detection signal to the control unit 41. The control unit may be a unit dedicated to the single unwinder 1A, 1B, or to the unwinding section 1, or to a larger portion of the converting line.

Following the signal received, the control unit 41 may intervene on the converting section with which the sensor S1 is associated, in this specific case on the unwinder 1A. This operation may consist in the temporary slowdown of the unwinder. In the illustrated example, the speed decreases from 600 m/min to 60 m/min. These values are given just by way of non-limiting example.

Then, two situation can occur: the operator exits the collaboration area 15 and in general the area controlled by the sensors (block 103), or moves closer to the unwinder, entering the alarm zone 17 (block 105). In the first case, due to the absence of people in the area controlled by the sensors, detected by the control unit 41, the unwinder 1A, 1B returns to the working speed (previous target speed). Vice versa, if the sensor S1 detects that the individual has entered the alarm zone 17, the signal received by the control unit 41 causes the unwinder to stop (deceleration up to 0 m/min). Once zero speed has been achieved (block 107), the doors 33 can be opened, or in general the opening of the doors is enabled and the unwinder is in stop condition (block 109). If the unwinder 1A, 1B is not in stop condition, the doors are locked; they cannot be opened and it is impossible to access the area with the moving machinery.

To restart the unwinder, it is necessary that the areas controlled by the sensors S2 and S3 are free again, i.e. without people inside them. This control is indicated in block 111. If the areas are not free, an alarm is generated. If they are free, the doors 33 are automatically closed, as indicated in block 113. If the area controlled by the sensor S1 (alarm area 17 and collaboration area 15) is free (block 115), the unwinder 1A, 1B is restarted. If not, the doors 33 are automatically opened (block 117) and the control unit 41 returns to block 109.

From what described with reference to FIG. 4 it is easily understood that the operator can move close to the unwinder 1A, 1B safely (access to the collaboration area 15) in order to observe the machinery operation without risks. The collaboration area may actually cover also the steps 29, 31 and the landings 25, 27. They are controlled by the sensors S2, S3 that, similarly to sensor S1, communicates with the control unit 41. In this way, the operator can move close to the raised platform 21, 23 without risks, and observe the machine from a greater height than that of the walking floor.

If, for any reason, the operator moves close to the alarm zone 17, the machine is stopped and the operator is again in safe conditions.

Accessing the platforms 21, 23 is prevented by closing the doors 33, that are locked if the unwinder 1A, 1B is not in stop condition (block 107).

Figure 5:
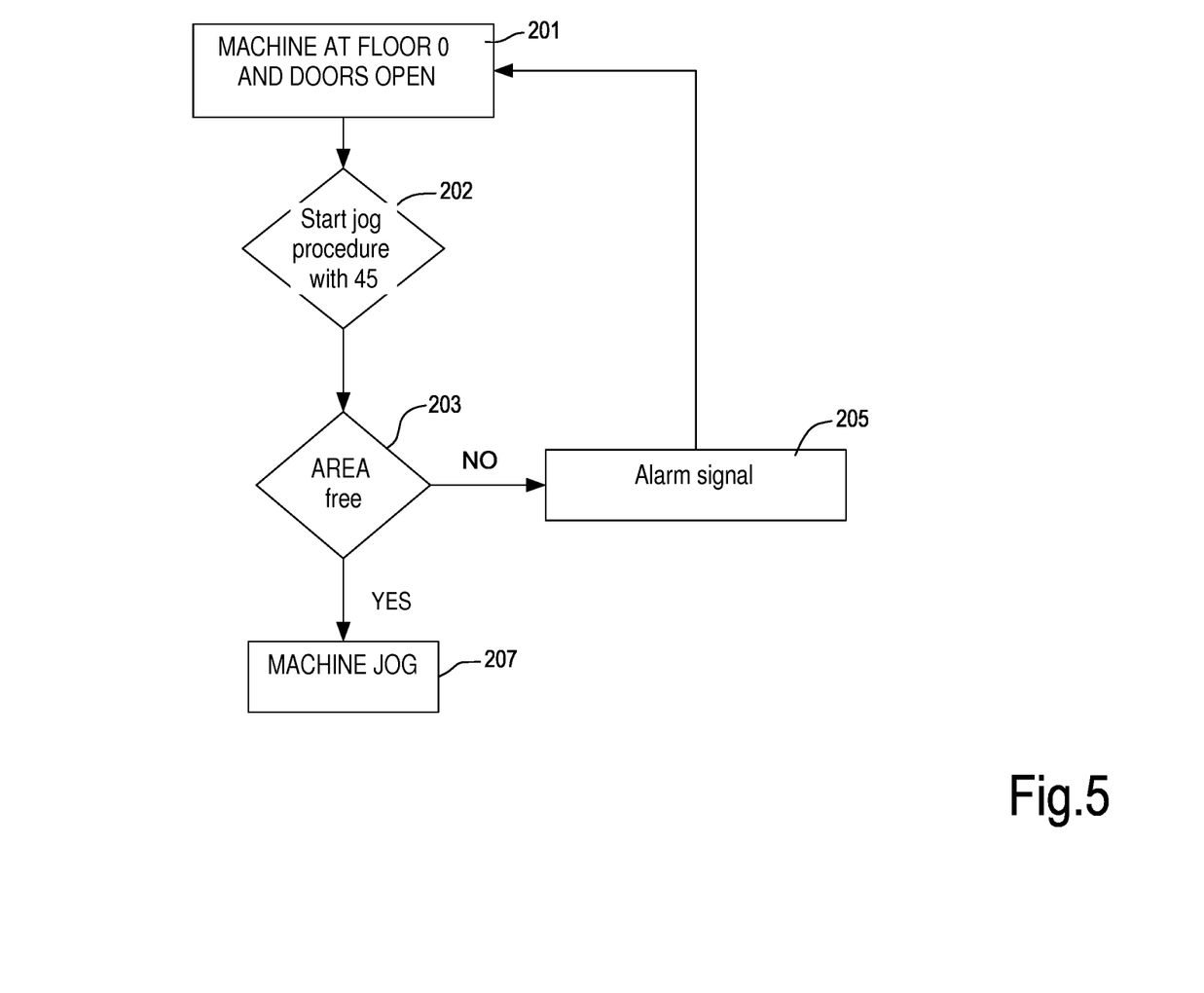

When the unwinder has been stopped (block 109 FIG. 4), operations can be performed inside the unwinder, for example it is possible to thread the leading edge of the web material of a new roll after a finished roll has been replaced or following breakage of the web material, which requires the operator to bring again the web material from the unwinders to the downstream machine, typically a rewinder. This operation is known as "jog". It is performed by an operator, who shall perform it correctly and who shall access the platform 35, 37, where a pushbutton station 45 is for example provided (shown only in FIG. 2A for the sake of simplicity of drawing) for controlling these operations. The diagram of FIG. 5 shows the operation of the system for detecting the presence of people in the areas controlled by the sensors S1, S2, S3. From block 201, when the machine is shut down, the operator can access the platform 23, as the door 33 is open. He/she starts the jog step through the pushbutton station (block 202). Before performing the jog operations, which require a slow restart of the unwinder, the control unit 41 may check (block 203) whether, in the other unwinder, the alarm area controlled by the sensor S1 and the areas controlled by the sensors S2, S3 are free. If no, an alarm is generated (block 204) and the jog procedure is not performed. Vice versa, if the areas controlled by the sensor S1 (alarm area 17) and by the sensor S3 (platform 23) are free, it is allowed to start the jog procedure (block 207). Once the jog procedure has been finished, the operator communicates to the control unit 41, through the pushbutton station 45, the end of the operation, and exits the platform 23. Now, the control unit can restart the unwinder through a procedure for controlling the free areas and closing the doors 33, as described with reference to the flow diagram of FIG. 4.

Figure 6:
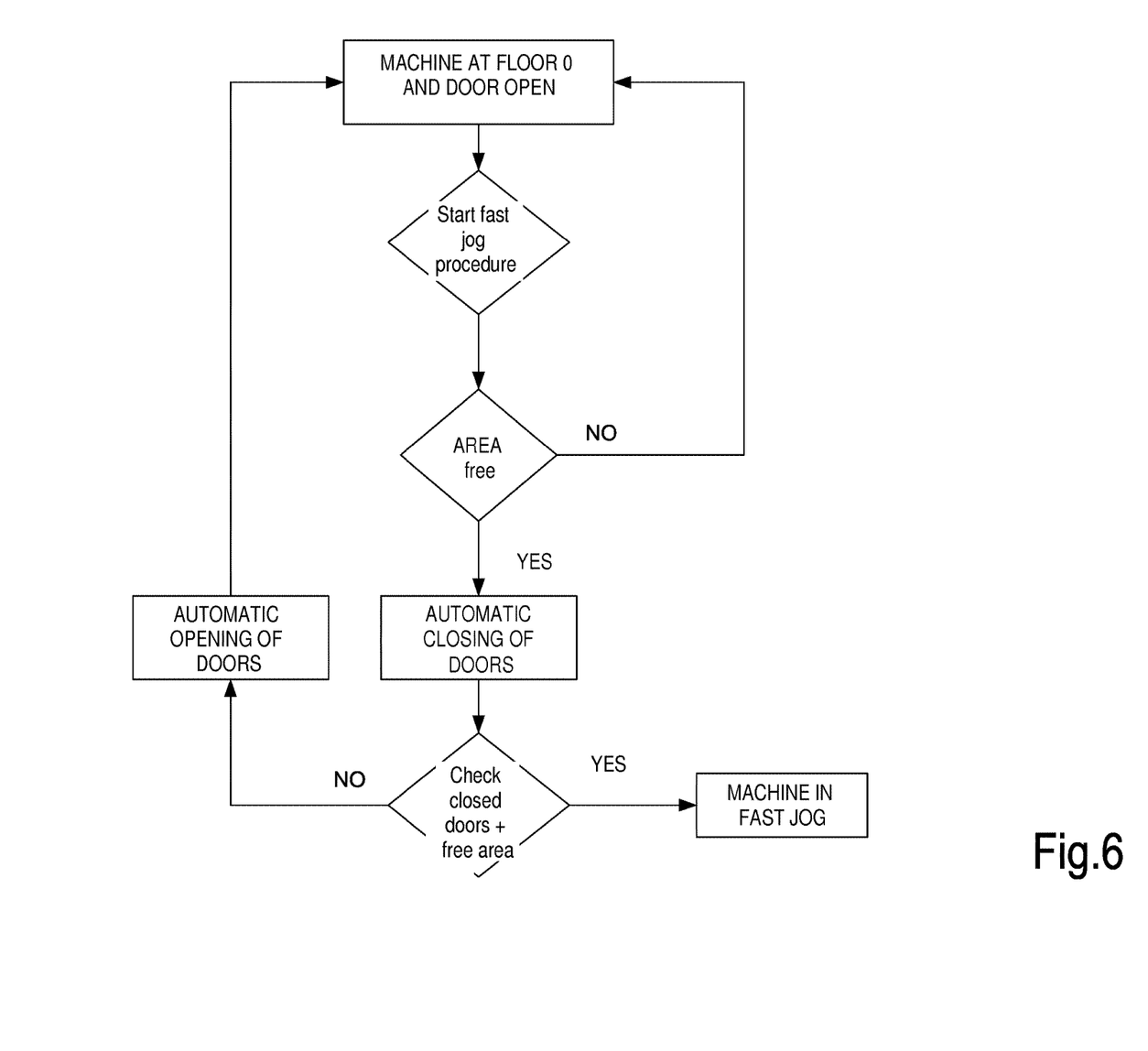

The jog procedure described with reference to the flow diagram of FIG. 5 is a slow procedure, that can be performed while the operator is on the platform 23. In some embodiments, the unwinder may allow a fast jog procedure; in this case, for safety grounds, the operator shall not be on the platforms 21, 23 nor in the alarm zone 17. A fast jog can be therefore performed only when the operator is in a collaboration area 25, 27, 15. FIG. 6 schematically shows this procedure.

Figure 7:
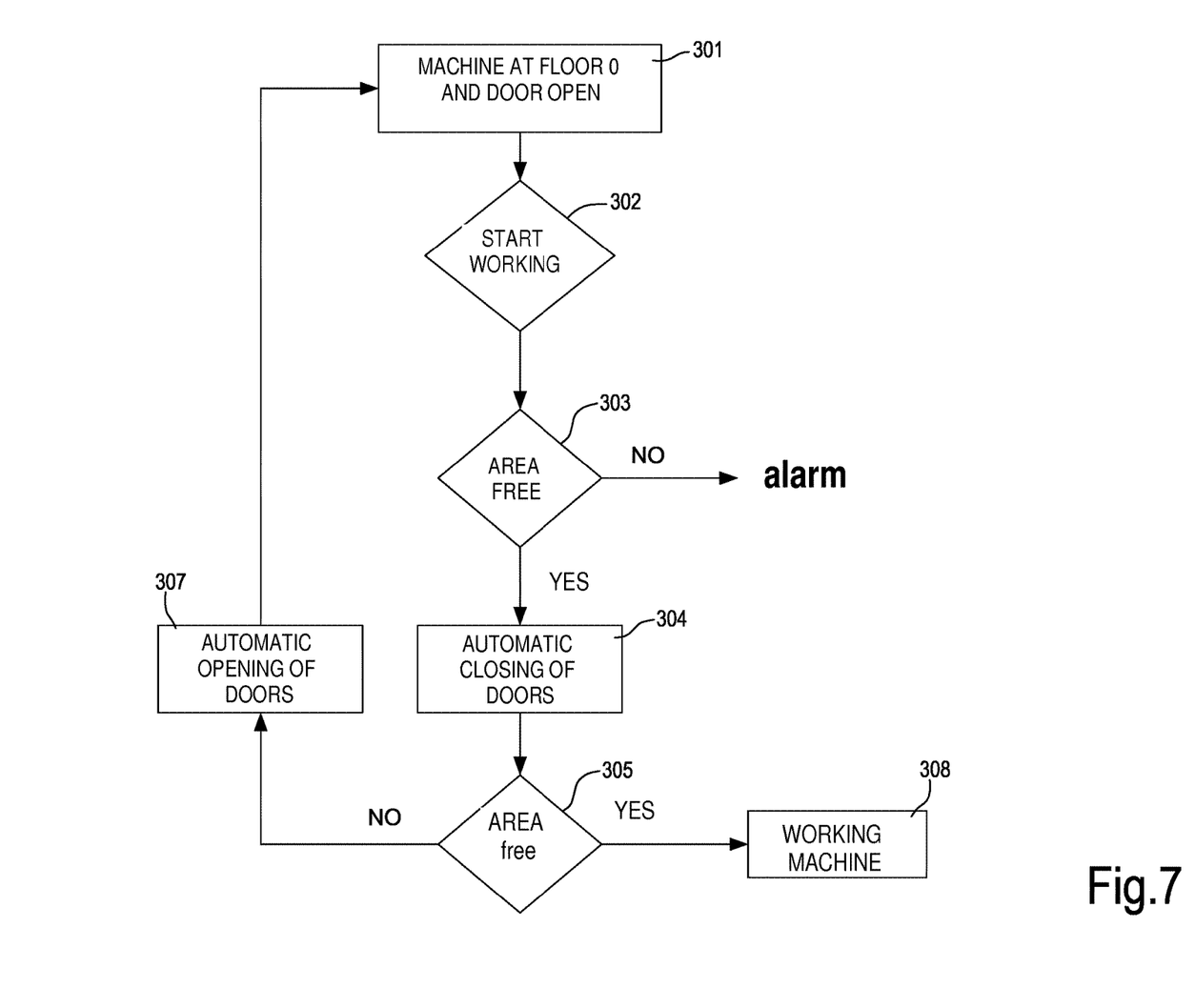

FIG. 7 shows a flow diagram of the procedure for restarting the unwinder 1A, 1B after having performed an operation requiring the stop thereof, for example a jog or fast jog procedure as described above. In FIG. 7, in block 301 the unwinder is not working and the doors 33 are open. The operator, through a pushbutton station 47 (schematically shown only in FIG. 2B for the sake of simplicity) can control, through the control unit 41, the restart of the unwinder (block 302, FIG. 7). Before restarting the unwinder, it is necessary to verify that the risk areas are free. This step, schematized in block 303, can be performed based on the signals provided by the sensors S2 and S3, verifying that no operators are on the platforms 21, 23, and on the signal provided by the sensor S1, verifying that no operators are in the alarm zone 17. In some cases, the pushbutton station 45 can be arranged outside the collaboration area 15; in this case, the unwinder can be restarted only if the sensor S1 detects that no people are present in the collaboration area 15 too. If people are detected in any one of the areas controlled by the sensors S1 (alternatively, both the areas 15, 17 or the area 17 only), S2 and S3, the restart procedure is interrupted and an alarm is generated. If there are no people in the areas, the doors 33 are closed (block 304). After having closed the doors 33 it is possible to further verify whether people are present in the risk areas, as shown in block 305. If people or obstacles are detected in the risk areas, the restart procedure is interrupted and the doors 33 are opened (block 307). If no people are detected in the risk areas, the unwinder is restarted (block 308).

Figure 8:
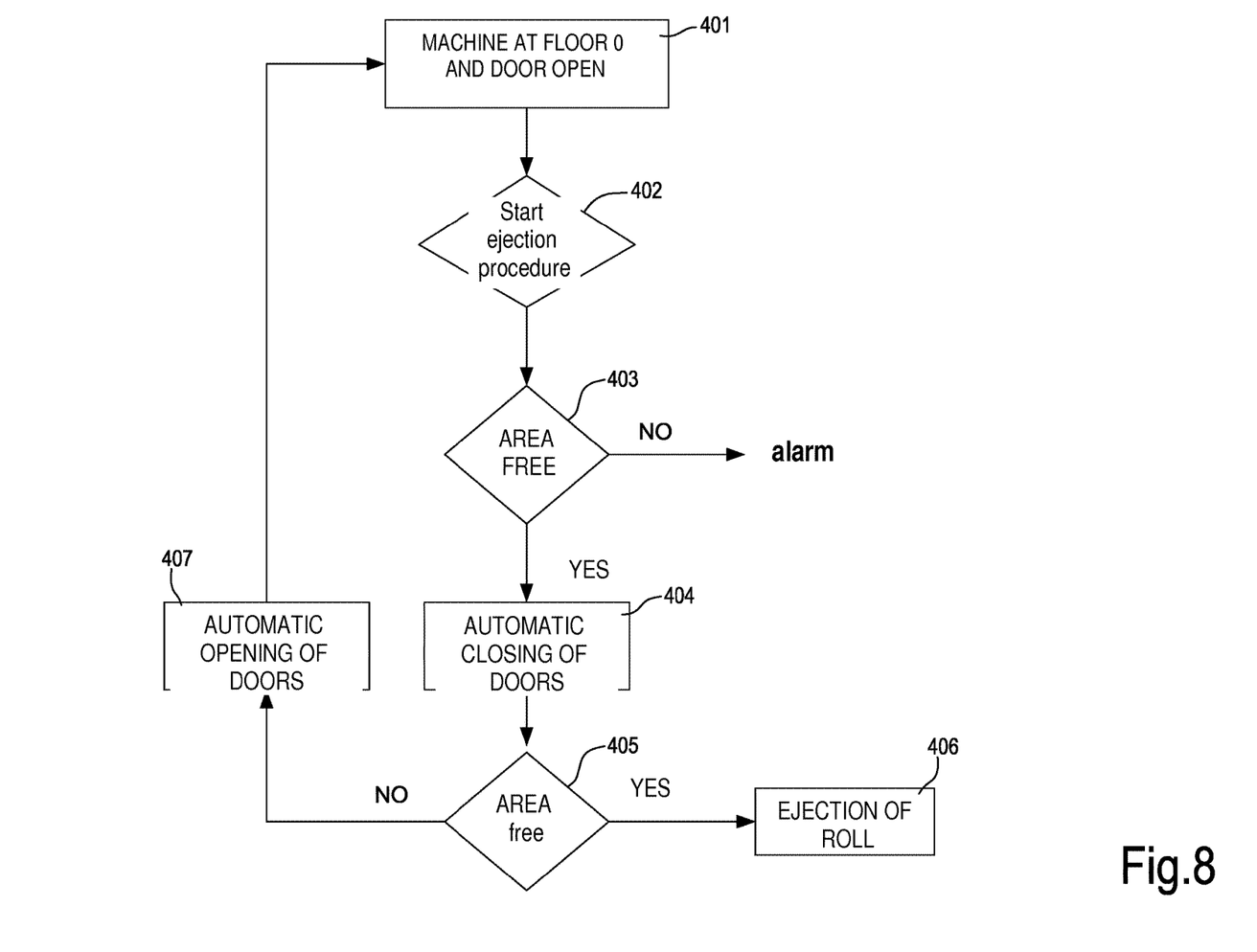

FIG. 8 shows a flow diagram for safely unloading, i.e. ejecting, a finished roll. The procedure begins (block 401) when the unwinder is not working and the doors 33 are open. The operator can perform the operations from the platform 23, for example through the pushbutton station 45. The ejection procedure begins in block 402. In block 403 the presence of people is verified in the areas controlled by the sensor S1 (alarm area 17, or alarm area 17 and collaboration area 15) as well as in the area controlled by the sensor S3. In case people are present, an alarm is generated. If no people are present, the doors 33 are closed, block 404, and a further check may be performed (block 405) for verifying, through the sensors S1 and S3, that no people are present. If no people are in the controlled areas, the ejection cycle is performed for the finished roll (block 406); on the contrary, the doors 33 are opened again (block 407) and the procedure is interrupted.

In the description above, reference has been made to the detection of people in the controlled areas through the sensors S1, S2, S3. However, the disclosed system is not limited to detecting the presence of people; namely, it can also detect the presence of obstacles or objects, for instance equipment used for maintenance and accidentally left unattended in areas where they should not be. In general, through the sensors S1, S2, S3 it is possible to detect obstacles or objects of any kind, both static or moving, whose presence shall be signaled so that the control unit can act accordingly, for example preventing the restart of the converting section if obstacles or objects, that can be dangerous, are detected inside the areas controlled by the system.

The access system described above with specific reference to an unwinder 1A, 1B can be also applied to other machines, for example tail sealers, machines for accumulating the logs, for packing and bagging products, and the like. For example, in a log accumulating machine, having such an inertia and movement to allow a sudden and immediate stop, it is possible to remove the protective casing by controlling, through sensors similar to those described above, the operating speeds or the work/stop conditions based on the position of the operator. In an exemplary embodiment it is possible to define an alarm area starting from a position adjacent to the machine and extending for a suitable width, within which the presence of an obstacle and/or an individual causes the stop of the accumulating machine. In a safer area, i.e. an area farther from the machine, starting from the alarm zone and extending for a given width, it is possible to configure a collaboration area where the speed of the accumulator is reduced if an operator or an obstacle is detected. In this way, if an operator shall quickly access the machine for removing jammed material, it is sufficient that he/she moves close to the machine to cause firstly a slowdown and then a stop of the machine before he/she achieves a potentially dangerous area. Once the jamming has been solved, or the necessary verification has been performed, the machine can be automatically restarted as no people are in the alarm areas, or in the alarm areas and in the collaborative areas. This solution improves ergonomics and visibility of the machinery, as the machinery is devoid of casing or other safety hindrance. The same access system can be also applied to a tail sealer, i.e. a machinery which closes the tail edge of a log of web material, as it is possible to stop the operation thereof relatively quickly.

In packing machines it is possible to define a side or one or more areas where there are mechanical transmission, motors and, preferably, most of the moving mechanical parts, fenced with a traditional casing, and one or more sides or areas where the machine is controlled through the presence sensors as described above, in order to increase visibility thereof and accessibility thereto. For example, it is possible to manage, through alarm areas and collaboration areas, the portions of machine where it is necessary to access to remove jamming or areas where it is necessary to have visibility for visually monitoring the packing procedure and, thus, the quality of packs. The same considerations apply to machines for bagging or to palletizing machines.

The invention has been described with reference to various specific embodiments, but it will be clearly apparent to those skilled in the art that many modifications, changes and omissions are possible, without however departing from the spirit and the scope of the claims.

The invention claimed is:

1. A tissue paper converting section, comprising:
   a converting machine; and
   a detection system adapted to detect a presence of one or more persons near the converting section, the detection system comprising at least a first presence sensor adapted to detect the presence of one or more persons in at least a controlled area;
   wherein said controlled area is subdivided into an accessible area that can be accessed when the converting machine is working, and an alarm area;
   wherein said detection system is adapted to distinguish between presence of an individual in the accessible area and presence of an individual in the alarm area; and
   wherein the detection system is connected to a control unit adapted to intervene on operation of the converting section based on information provided by the detection system.

2. The section of claim 1, wherein the controlled area extends along a side of the converting section.

3. The section of claim 1, wherein the converting section is an unwinding section which comprises at least an unwinder for unwinding logs of web material.

4. The section of claim 1, wherein based on information provided by the detection system, the control unit is adapted to stop the converting machine when the detection system detects an individual entering the alarm area from the accessible area.

5. The section of claim 1, wherein the control unit is adapted:
- to keep the converting section working if the detection system detects a presence of an individual in the accessible area, but does not detect a presence of an individual in the alarm area;
- to stop the converting section if the detection system detects a presence of an individual in the alarm area.

6. The section of claim 1, wherein the control unit is adapted:
- to intervene on the converting section if the detection system detects a presence of an individual in the accessible area, but does not detect a presence of an individual in the alarm area, said intervention comprising slowing down the converting section from a working speed to a reduced speed;
- to stop the converting section if the detection system detects a presence of an individual in the alarm area.

7. The section of claim 1, wherein the alarm area comprises a non-fenced area for moving towards the converting section, said non-fenced area comprising the accessible area.

8. The section of claim 1, wherein the detection system comprises at least one second presence sensor, adapted to detect a presence of one or more persons in an auxiliary controlled area arranged at greater height than the controlled area.

9. The section of claim 8, wherein the control unit is adapted to intervene on the converting section if the detection system detects a presence of an individual in the auxiliary controlled area, but does not detect a presence of an individual in the alarm area, said intervention keeping the converting section working.

10. The section of claim 1, comprising at least one fenced area closed by an access door, wherein the fenced area is controlled by at least one second presence sensor of the detection system; and wherein the second presence sensor and the access door interface the control unit, which is adapted to stop the converting section if the access to said fenced area by an individual is detected.

11. The section of claim 8, comprising at least one fenced area closed by an access door; wherein the fenced area is controlled by at least one second presence sensor of the detection system; and wherein the second presence sensor and the access door interface the control unit, which is adapted to stop the converting section if the access to said fenced area by an individual is detected; and wherein the fenced area can be accessed from the auxiliary controlled area and wherein the second presence sensor detects the presence of one or more persons in the auxiliary controlled area and in the fenced area.

12. The section of claim 10 wherein the fenced area extends transversally to the converting section.

13. The section of claim 1, wherein each said presence sensor comprises an electromagnetic wave sensor with operative ranges up to 8.4 meters and minimal dimension of the detectable items of 20 mm.

14. The section of claim 1, wherein each said sensor is so arranged as to have a field of view skimming over a respective floor of the area controlled thereby.

15. The section of claim 1, wherein said control unit is adapted to slow down the speed of the converting section when an individual is detected in the accessible area but no individual is detected in the alarm area.

16. The section of claim 15, wherein the control unit is so configured that, if after the slowdown of the converting section, the detection system detects one or more persons moving away from the accessible area, the control unit increases the speed of the converting section.

17. The section of claim 1, wherein the converting section is selected from a section for closing a tail end of rolls produced by a rewinder, a rolls accumulator, a wrapping machine, a bagging machine, and a product palletizing machine.

18. A method for controlling access to a tissue paper converting section of a tissue paper converting line, said section comprising moving machines; wherein the method comprises steps of:
- controlling, by at least one presence sensor, an accessible area that can be accessed when the line is working, and an alarm area;
- if an individual enters the accessible area without entering the alarm area, allowing operation of the converting section to continue;
- if an individual enters the alarm area, stopping operation of the converting section.

19. The method of claim 18, further comprising intervening on operation of the converting section without stopping the operation, if an individual enters the accessible area without entering the alarm area.

20. The method of claim 19, wherein the intervening on the operation of the converting section comprises slowing down the converting section from a working speed to a reduced speed.

21. The method of claim 20, further comprising accelerating again the speed of the converting section towards the working speed when the individual exits the accessible area.

22. The method of claim 18, further comprising:
- keeping closed a fenced area associated with the converting section by an access door when the converting section is working;
- opening the access door when the converting section is not working;
- controlling presence of people in the fenced area by a further presence sensor;
- allowing restart of the converting section after having closed the access door if the further presence sensor detects that there are no people in the fenced area and said at least one presence sensor detects that there are no people inside the alarm area.

* * * * *